United States Patent
Clark

(10) Patent No.: US 7,010,033 B2
(45) Date of Patent: Mar. 7, 2006

(54) SYSTEM AND METHOD FOR COMPRESSING AND ENCODING VIDEO

(75) Inventor: Adam Leslie Clark, Melbourne (AU)

(73) Assignee: Adams Platform Pty Ltd., Croyden (AU)

( * ) Notice: Subject to any disclaimer, the term of this patent is extended or adjusted under 35 U.S.C. 154(b) by 96 days.

(21) Appl. No.: 10/771,048

(22) Filed: Feb. 2, 2004

(65) Prior Publication Data

US 2005/0169366 A1 Aug. 4, 2005

(51) Int. Cl.
H04N 7/12 (2006.01)

(52) U.S. Cl. .................. 375/240.01; 382/164; 345/600

(58) Field of Classification Search .......... 375/240.01, 375/240.08; 382/235, 239, 164; 345/600; 348/396.1
See application file for complete search history.

(56) References Cited

U.S. PATENT DOCUMENTS

| | | | |
|---|---|---|---|
| 5,021,880 A | 6/1991 | Graves | |
| 5,164,819 A | 11/1992 | Music | |
| 5,699,460 A | 12/1997 | Kopet et al. | |
| 5,796,864 A | 8/1998 | Callahan | |
| 6,058,211 A * | 5/2000 | Bormans et al. | 382/235 |
| 6,091,850 A | 7/2000 | Ostrovsky | |
| 6,256,350 B1 | 7/2001 | Bishay et al. | |
| 6,301,389 B1 | 10/2001 | Penna | |
| 6,574,364 B1 | 6/2003 | Economidis et al. | |
| 6,594,386 B1 | 7/2003 | Golshani et al. | |
| 6,611,274 B1 * | 8/2003 | Keely et al. | 345/600 |
| 6,658,146 B1 | 12/2003 | Iourcha et al. | |
| 6,683,978 B1 | 1/2004 | Iourcha et al. | |
| 6,751,256 B1 * | 6/2004 | Nickel | 375/240.01 |
| 6,785,429 B1 | 8/2004 | Senoh | |
| 2003/0031361 A1 | 2/2003 | Said | |
| 2004/0101045 A1 | 5/2004 | Yu | |

* cited by examiner

Primary Examiner—Gims Philippe
(74) Attorney, Agent, or Firm—Sonnenschein, Nath & Rosenthal LLP

(57) ABSTRACT

A method for encoding a video, comprises receiving the video as a plurality of pixel value sets, wherein each pixel value set of the plurality of pixel value sets represents a digitized pixel of the video. The plurality of pixel value sets are grouped into a plurality of digitized video frames. Each pixel value set of the plurality of pixel value sets includes a first portion and a second portion. The first portion of each pixel value set is encoded to provide a plurality of dominant color values.

27 Claims, 10 Drawing Sheets

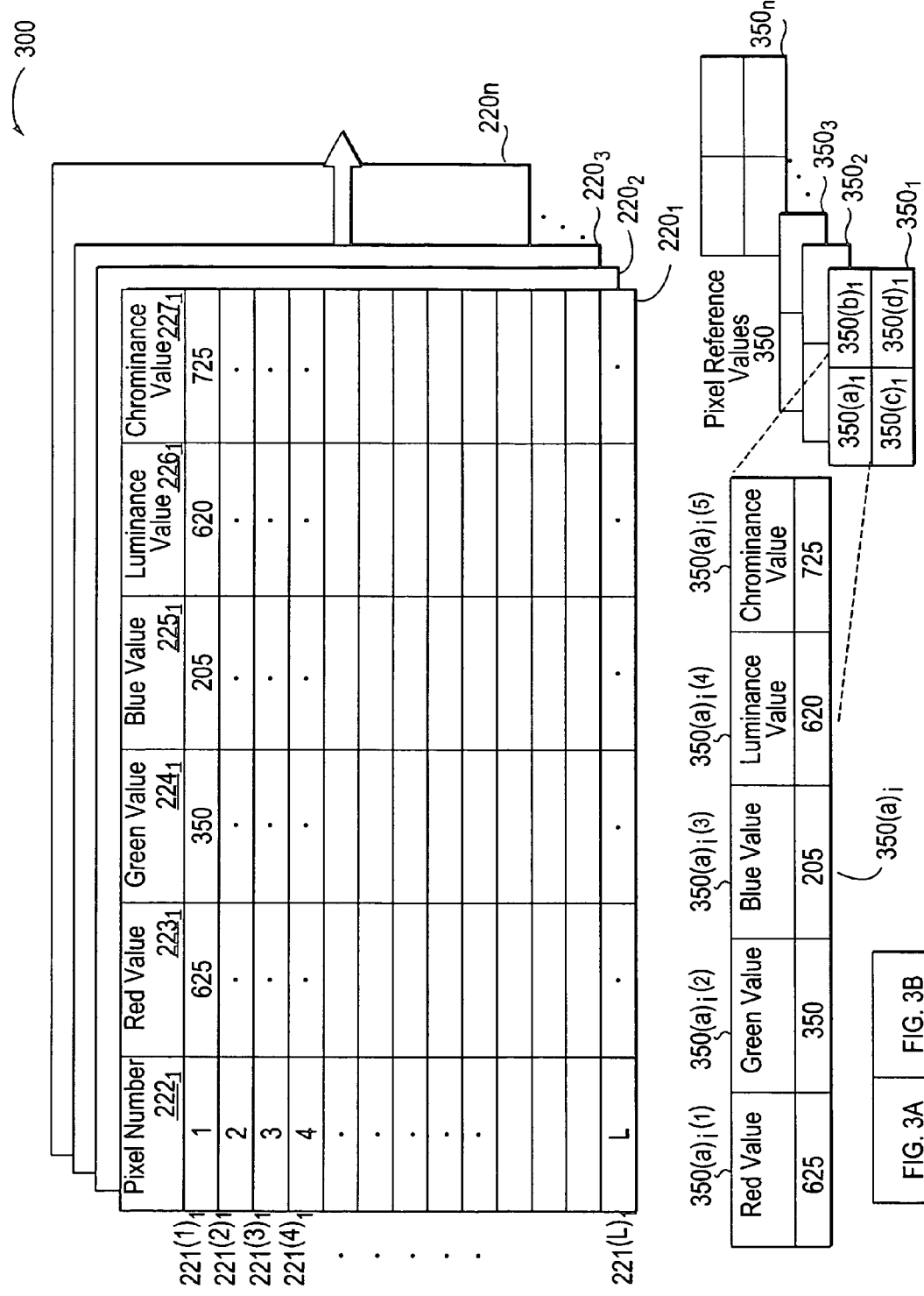

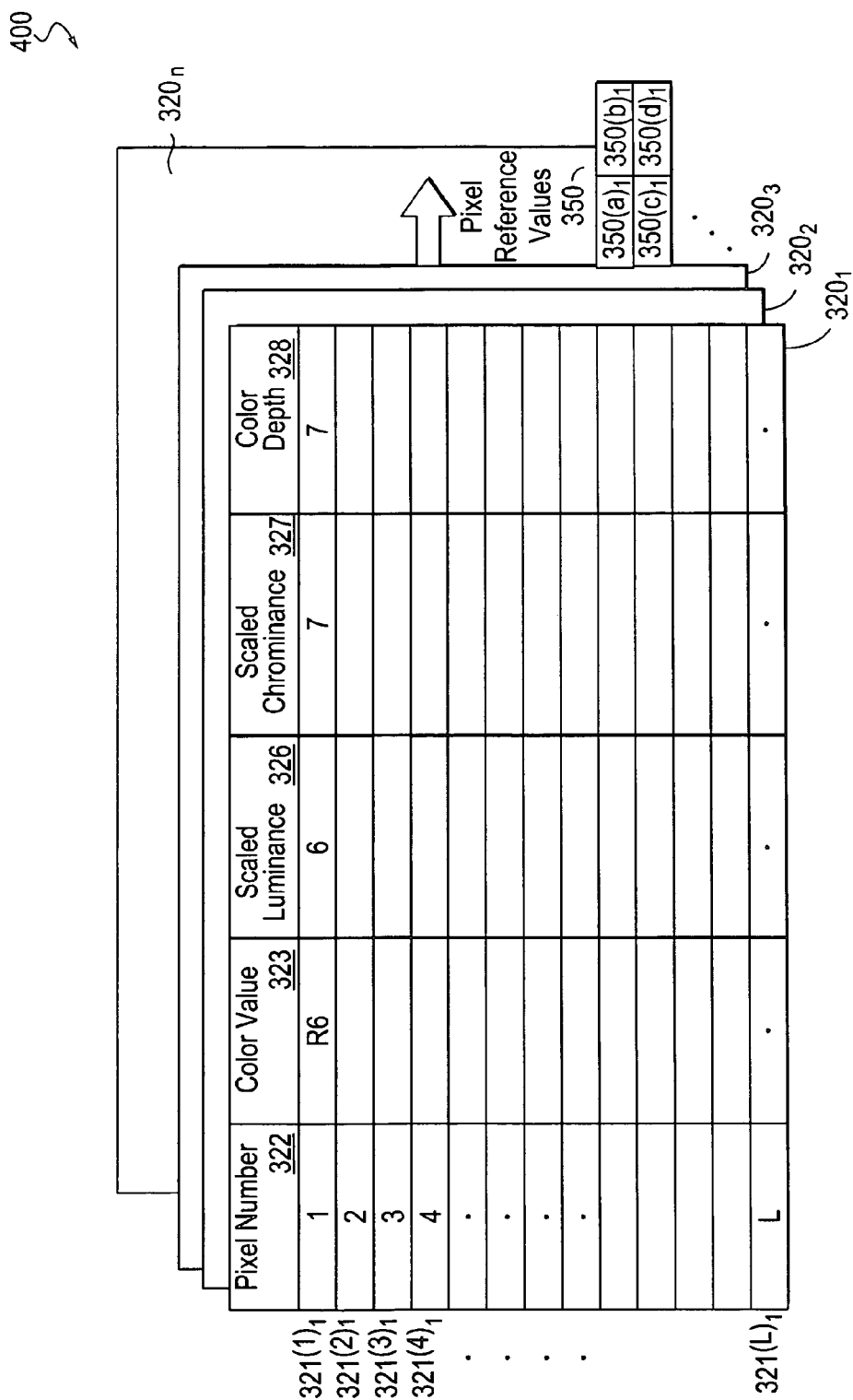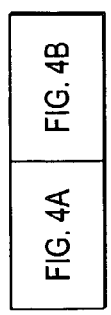

SYSTEM AND METHOD FOR COMPRESSING AND ENCODING VIDEO

FIELD OF THE INVENTION

The present invention relates generally to communication systems and, in particular, to a system and method for compressing and encoding video.

BACKGROUND OF THE INVENTION

Video signals can be digitized, encoded, and subsequently decoded in a manner which significantly decreases the number of bits necessary to represent a decoded reconstructed video without noticeable, or with acceptable, degradation in the reconstructed video. Video coding is an important part of many applications such as digital television transmission, video conferencing, video database, storage, etc.

In video conferencing applications, for example, a video camera is typically used to capture a series of images of a target, such as a meeting participant or a document. The series of images is encoded as a data stream and transmitted over a communications channel to a remote location. For example, the data stream may be transmitted over a phone line, an integrated services digital network (ISDN) line, or the Internet.

In general, connection of a user interface device to the Internet may be made by a variety of communication channels, including twisted pair telephone lines, coaxial cable, and wireless signal communication via local transceivers or orbiting satellites. Most user interface device Internet connections are made by relatively low-bandwidth communication channels, mainly twisted pair telephone lines, due to the existing infrastructure of such telephone lines and the cost of implementing high-bandwidth infrastructure. This constrains the type of information that may be presented to users via the Internet connection, because video transmissions using presently available coding techniques generally require greater bandwidth than twisted pair telephone wires can provide.

The encoding process is typically implemented using a digital video coder/decoder (codec), which divides the images into blocks and compresses the blocks according to a video compression standard, such as the ITU-T H.263 and H.261 standards. In standards of this type, a block may be compressed independent of the previous image or as a difference between the block and part of the previous image. In a typical video conferencing system, the data stream is received at a remote location, where it is decoded into a series of images, which may be viewed at the remote location. Depending on the equipment used, this process typically occurs at a rate of one to thirty frames per second.

One technique widely used in video systems is hybrid video coding. An efficient hybrid video coding system is based on the ITU-T Recommendation H.263. The ITU-T Recommendation H.263 adopts a hybrid scheme of motion-compensated prediction to exploit temporal redundancy and transform coding using the discrete cosine transform (DCT) of the remaining signal to reduce spatial redundancy. Half pixel precision is used for the motion compensation, and variable length coding is used for the symbol representation.

However these techniques still do not provide adequate results for the low-bandwidth connections such as dial-up connections or wireless device networks (e.g., GSM or CDMA) that have data transmissions rates as low as 9.6 kilobits/sec, 14.4 kilobits/sec, 28.8 kilobits/sec, or 56 kilobits/sec. For users at the end of a dial-up connection or wireless network, high quality video takes extraordinary amounts of time to download. Streaming high quality video is nearly impossible, (in terms of acceptable time limits for such actions) and providing live video feeds is very challenging.

SUMMARY OF THE INVENTION

A method for encoding a video, comprises receiving the video as a plurality of pixel value sets, wherein each pixel value set of the plurality of pixel value sets represents a digitized pixel of the video. The plurality of pixel value sets are grouped into a plurality of digitized video frames. Each pixel value set of the plurality of pixel value sets includes a first portion and a second portion. The first portion of each pixel value set is encoded to provide a plurality of dominant color values.

BRIEF DESCRIPTION OF THE DRAWINGS

The present invention will be understood and appreciated more fully from the following detailed description taken in conjunction with the drawings in which.

DETAILED DESCRIPTION

Figure 1:
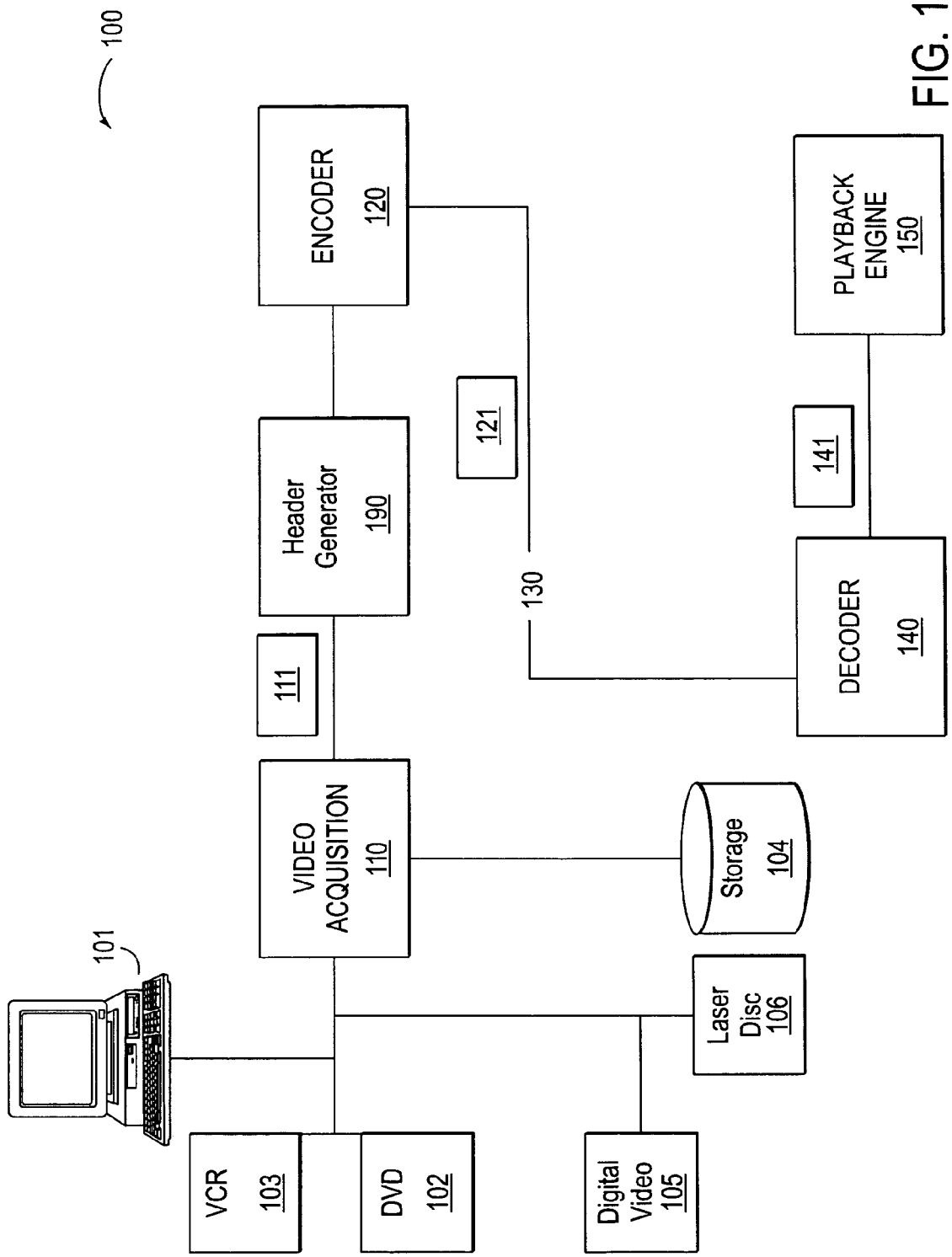
FIG. 1 illustrates a block diagram of an exemplary system for compressing video information, according to one embodiment of the present invention.

A system and method for encoding/decoding video data are described. The present encoding/decoding system and method overcome prior deficiencies in this field, by allowing high-quality video transmission over low-bandwidth connections. In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

FIG. 1 illustrates an exemplary block diagram of a system 100 for compressing video, according to one embodiment of the present invention. Video compression system 100 is designed to deliver high quantity video over low-bandwidth (e.g., 14.4–56 kBps) transmission links. Compression system 100 obtains video information from any of a number of sources such as a personal computer 101, Digital Versatile Disc player 102, Video Cassette Recorder 103, storage device 104, digital video tape camera or player 105, and/or laser disc player 106, among others. A digital video capture device 110 receives the video signals from any or all of the sources 101–106 and converts the video signal into a raw data file format. Capture device 110 may be any combination of hardware and software video acquisition product, such as Media Compose and Symphony software suites manufactured by Avid Technologies, Black Magic Design by Decklink for use with Apple's Final Cut video editing software, and Canopus video capture devices. The raw video data 111 may be in any uncompressed format. For purpose of this description, the terms "file," "data," and "packets" are used interchangeably.

Generally, audio signals accompany the video signals from source devices 101–106. The audio signals are digitized (if necessary) and provided along with the raw video data 111 in a two-channel, 22 kHz uncompressed format, in one embodiment. The audio data may be processed independent of the video data 111, according to any audio compression method including "MP3" and "wav" formats. Such audio may be synchronized with the video data file 111 at any point within the compression system 100.

The raw video data 111 is provided to a header file generator 190. The new header file produced by header file generator 190 may be appended to raw video data 111 and includes various information regarding the audio data and raw video data 111, such as file sizes in bytes, video frame starting and ending points, tags at certain video frame intervals (e.g., every tenth frame), the number of video frames per second, total number of frames, the screen resolution (i.e., the number of pixels per frame), color depth information, and similar types of data regarding the files.

Compression system 100 uses an encoder 120 to compress raw video data 111. The encoder 120 produces a compressed video file 121 having header information. The header information includes resolution settings for the decoder, audio/video synch information, playback commands, reference pixel values, and optional information, such as a key frame indicator used for trick play modes. The majority of the compressed video file 121 is a table of pixel value sets for each pixel in each video frame in the sequence. Additionally, certain optional files are generated by encoder 120, such as a trailer file (used with AVS tools). Encoder 120 also produces an audio output file, that may or may not be compressed. For purposes of this specification reference to the compressed video file 121 includes any audio files, optional files and/or header information. The details of the encoding process performed by encoder 120 will be discussed below.

The compressed video file 121 may be transmitted over a network 130 (which is described in greater detail below) to a decoder 140. Decoder 140 decodes video file 121 and provides decoded video 141 to playback engine 150. Additionally, audio information is synchronized with the decoded video file 141, and provided to playback engine 150. The process performed by decoder 140 will be described in detail below. Playback engine 150 may include a display device adapted to accept video data. In addition, the playback engine may include conventional means for transforming the decoded video file 141 to a format compatible with conventional display devices. Any display device such as a television, cellular phone, personal computer, personal data assistant (PDA), automobile navigation system, or similar device may be used. Having provided a high level overview of compression system 100, a detailed description of its components will be presented.

Figure 2:
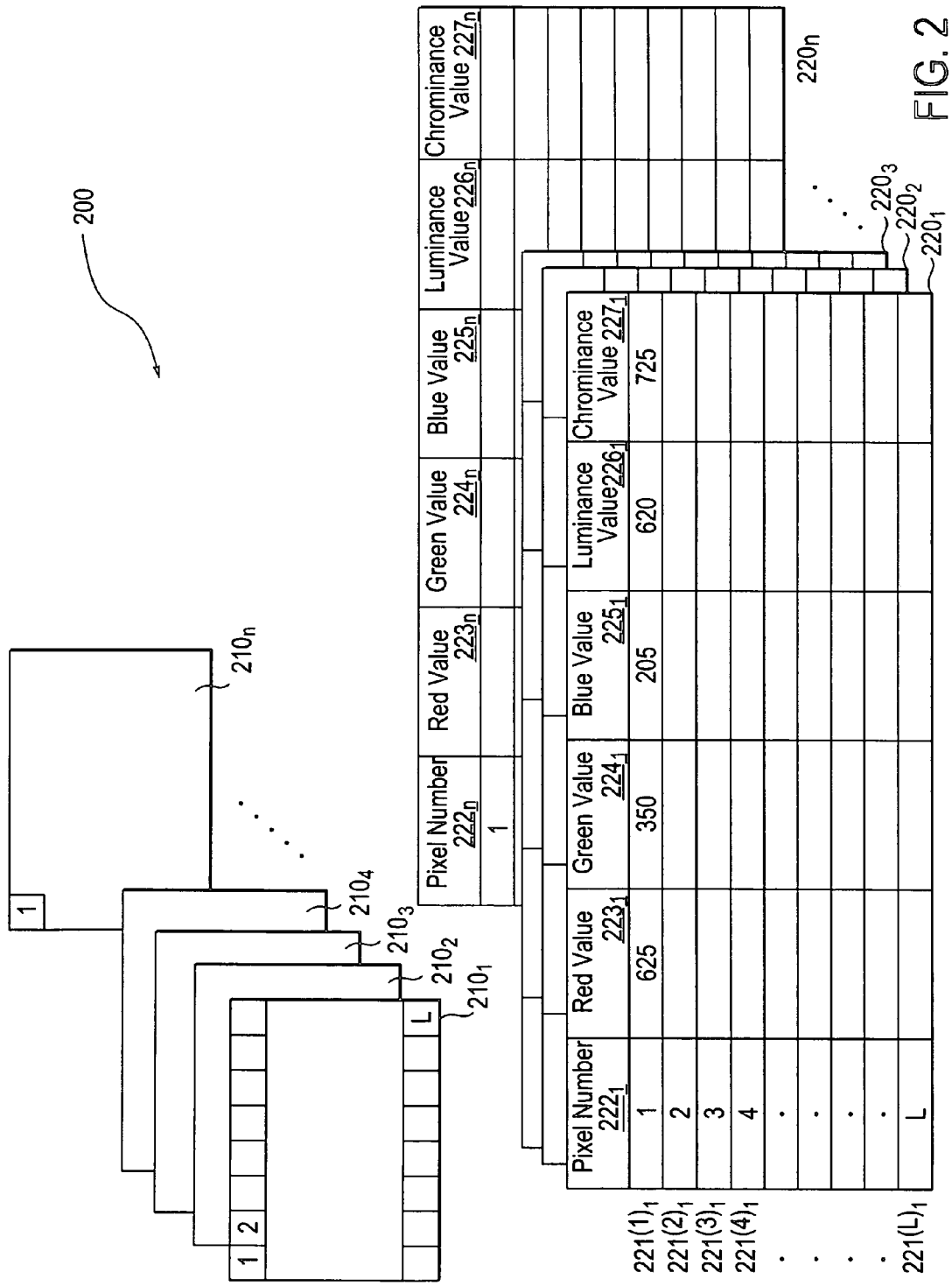
FIG. 2 illustrates a diagram of an exemplary sequence of video frames with its corresponding raw video data, according to one embodiment of the invention.

FIG. 2 illustrates an exemplary sequence of the present invention of video frames with its corresponding raw video data, according to one embodiment of the present invention. Video sequence 200 is composed of a number of video frames $210_1$–$210_n$. Each video frame 210 is composed of thousands of pixels. The exact number of pixels in a frame depends upon the video format. The present method and system supports National TV Standards Committee (NTSC) having 30 interlaced frames per second at 525 lines of resolution and includes an audio FM frequency and an MTS signal for stereo. Additionally, Phase Alternating Line (PAL) standards having 25 interlaced frames per second at 625 lines of resolution are supported. System en coleur avec memoire (SECAM) and similar protocols are likewise supported, as are Digital High Definition TV (HDTV) standards. Additionally, protocols for display on personal computers, cellular phones, and PDA's are supported. Digital video capture device 110 generates frames $210_n$ and provides a raw video data file 111 that describes the video frames 210, and each pixel of each video frame 210. The data file 111 contains raw video data tables $220_i$, where each row $221(L)_i$ corresponds to a pixel in a video frame $210_n$. The columns of raw video data table $220_i$ describe the pixel number $222_i$, a red color value $223_i$, a green color value $224_i$, a blue color value $225_i$, a luminance value $226_i$, and a chrominance value $227_i$. In alternate embodiments, any color space may be used such as cyan, magenta, yellow, and black (CMYK).

A typical minute of video ranges in size from 1.0 to 1.8 Gigabytes. Consequently, a digital video file of any appreciable length (e.g., a thirty minute program) is of considerable size.

Figure 3B:
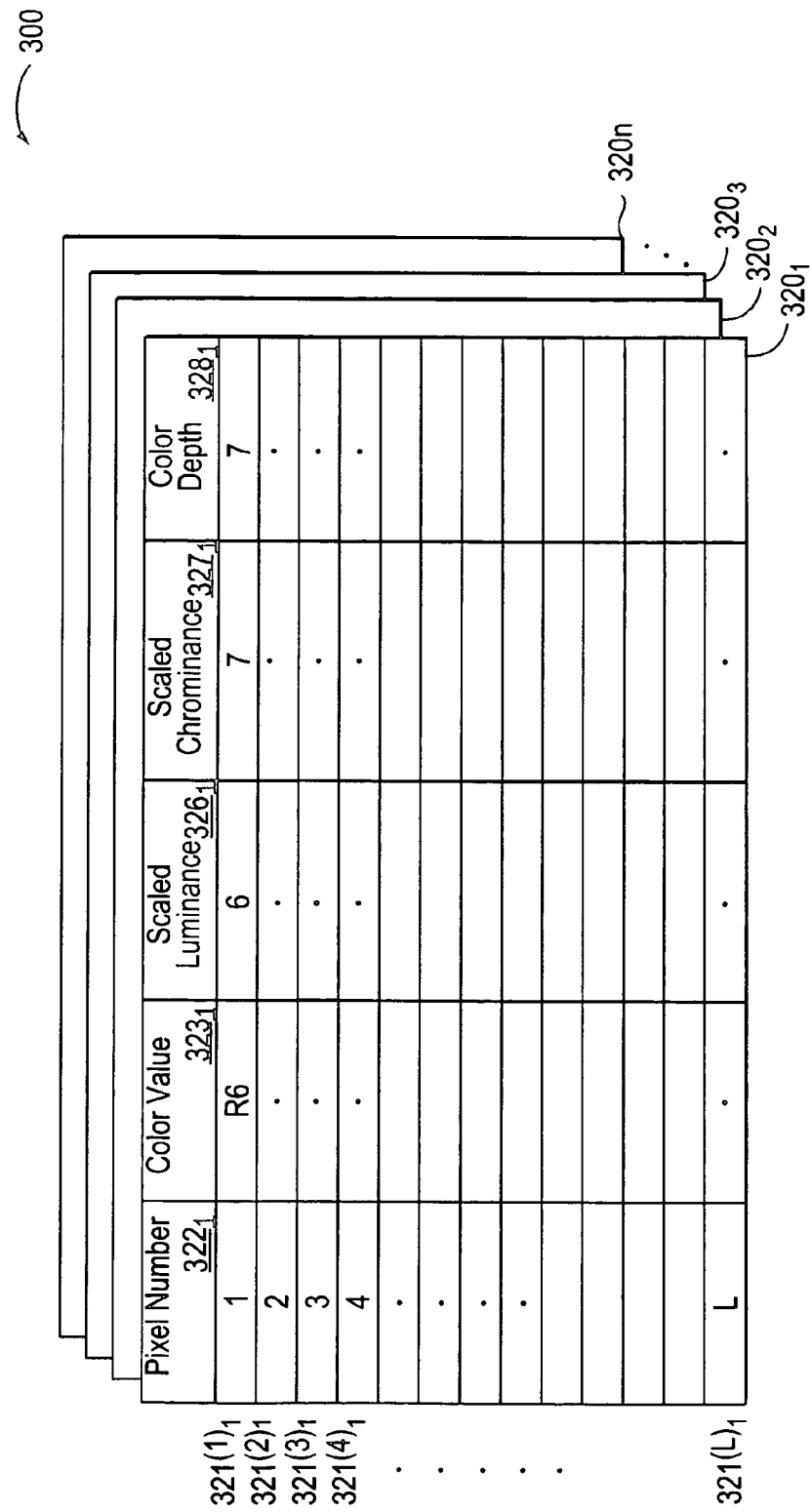
FIG. 3 illustrates a diagram of the exemplary encoding of a raw video table, according to one embodiment of the present invention.

FIG. 3 illustrates an example of encoding a raw video table $220_i$, according to one embodiment of the present invention. Raw video tables $220_i$ are encoded into compressed video tables $320_i$. The pixel number $222_i$ is mapped to pixel number $322_i$. The pixel value sets (i.e., RGB values $223_i$–$225_i$) are mapped to dominant color of pixel values $323_i$. The calculation of the dominant color value $323_i$ will be discussed in detailed below. The luminance value $226_i$ is mapped to a scaled luminance value $326_i$. The chrominance value $227_i$ is mapped to a scaled chrominance value $327_i$. The calculation of scaled chrominance and luminance values $327_i$, $326_i$ will be discussed below as well. Compressed video table $320_i$ also includes an optional color depth value $328_i$, where the color depth value $328_i$ is the average of the scaled chrominance and luminance values $327_i$, $326_i$, according to one embodiment.

For each row $221(1)_i$–$221(L)_i$ of raw video table $220_i$ a corresponding row $321_i$–$321_n$ of compressed video table $320_i$ is generated. According to one embodiment, as encoder 120 populates compressed video table $320_i$ pixel-by-pixel (i.e., row by row). If a row is determined to be identical to (or optionally, similar to within a tolerance value of) a previously populated row, encoder 120 places a pointer to the previous identical row rather then repopulating an entire new row of values within table $320_i$.

Encoder 120 also generates pixel reference value sets $350_i$ having a number of references $350(a)_i$–$350(d)_i$. According to one embodiment, four (4) reference pixel values $350(a)_i$–$350(d)_i$ are generated corresponding to the highest color intensity values of red, green, blue and black within a video frame $210_n$. As used herein, black is taken to be a maximum color saturation of red, green and blue. The reference pixel values $350(a)_i$–$350(d)_i$ are raw data values, as provided to the encoder 120. FIG. 3 shows an example of a pixel reference value $350(a)_i$. Pixel reference value $350(a)_i$ includes a red color value $350(a)_i(1)$ a green color value $350(a)_i(2)$, a blue color value $350(a)_i(3)$ a luminance value $350(a)_i(4)$, and a chrominance value $350(a)_i(3)$, a luminance value $350(a)_i(4)$, and a chrominance value $350(a)_i(5)$. The values may represent the highest interesting red, green, blue, or black pixel in video frame 210, is pixel number 1, then the values 625, 350, 205, 620, and 725 will be stored as pixel reference value $350(a)_i$ (1–5), respectively.

In alternate embodiments additional reference values may be used for chrominance, luminance, color depth, or similar graphics data or pixel parameters. Each video frame 210 has a corresponding set of pixel reference value sets $350(a)_i$–$350(d)_i$. Calculation of the pixel reference value sets $350_i$ will be discussed in greater detail below.

Figure 4B:
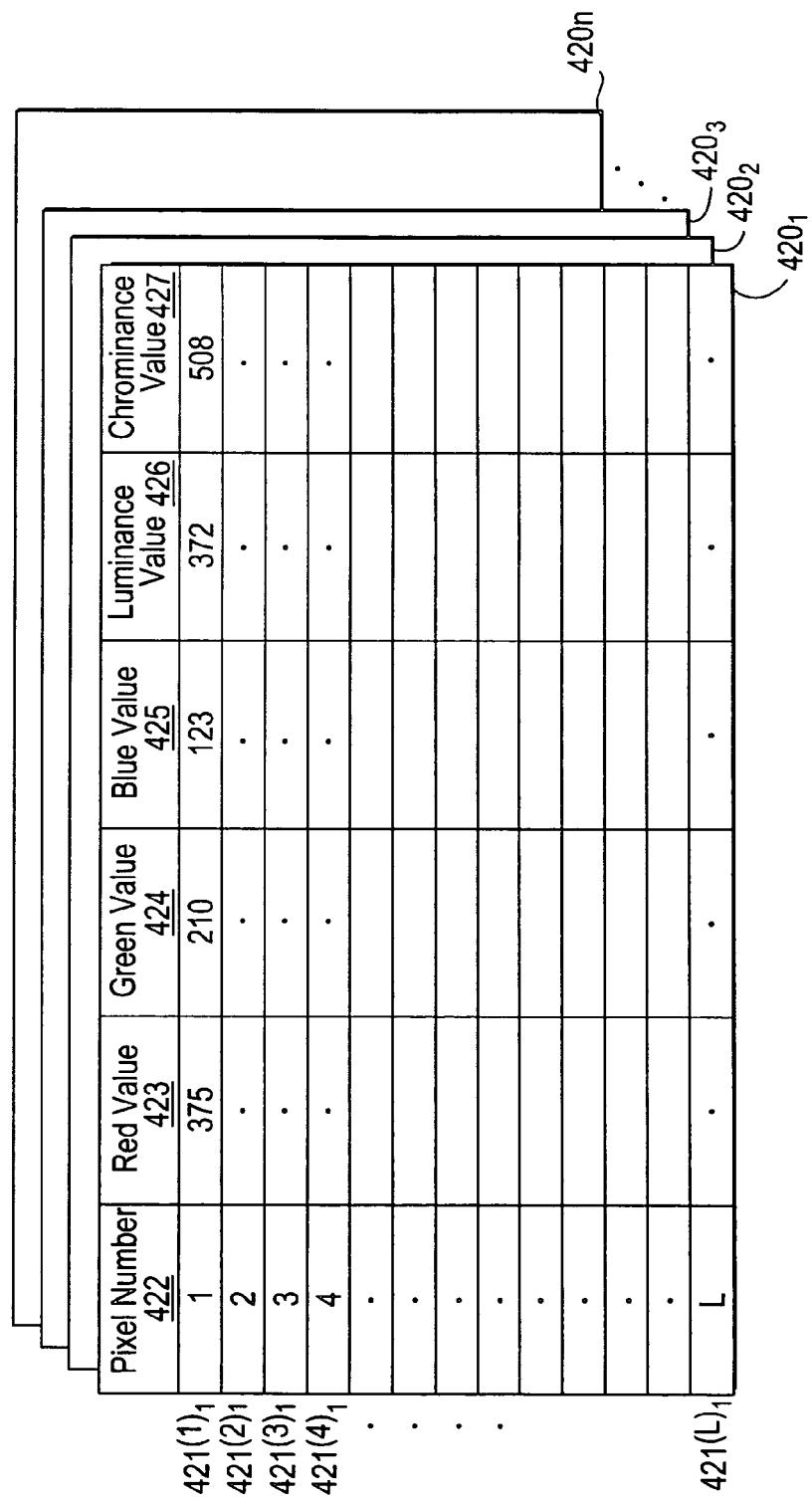
FIG. 4 illustrates a diagram of the exemplary decoding of a compressed video file, according to one embodiment of the present invention.

Upon processing by encoder 120, the resulting compressed video file 121 may be transmitted over a network 130 to a decoder 140. FIG. 4 illustrates an exemplary process of decoding a compressed video file 121, according to one embodiment of the present invention. Compressed video file 121 includes pixel reference values $350_i$ and compressed video tables $320_i$ for each video frame $210_n$ encoded by encoder 120. In another embodiment, compressed video tables 320 are all combined in one single table. However, for ease of explanation, a compressed video file 121 having a number of compressed video tables 320 will be discussed. Decoder 140 processes compressed video file 121 to provide a decoded video file 141. Decoded video file 141 includes a decoded video table $420_i$. Decoding diagram 400 shows the mapping of the compressed video table $320_i$ to the decoded video table $420_i$ using pixel reference values $350_i$. The pixel number $322_i$ is mapped to pixel number $422_i$. Dominant color value $323_i$ is extrapolated into decoded pixel color parameters (i.e., RGB values $423_i$–$425_i$). The luminance value $326_i$ is mapped to decoded luminance value $426_i$, and chrominance value $327_i$ is mapped to decoded chrominance value $427_i$. The decoded luminance value $426_i$ and chrominance value $427_i$ are only provided as examples of possible expanded value sets, generated by decoder 140. The process performed by decoder 140 to populate decoded video table $420_i$ will be described in detail below. The decoded video file 141 is provided to a playback engine 150 for viewing by a user.

The decoded video file 141 can be formatted for displays supporting different input protocols. Such protocols include NTSC, SECAM, PAL and HDTV, as described above. Additionally, support for computer displays is provided. If a low bandwidth network 130 exists between encoder 120 and decoder 140, encoder 120 may perform additional bandwidth saving functions. For example, a lower resolution version of the video may be encoded, or video fields may be dropped by only encoding odd or even rows, or encoding alternate pixels, or reducing screen resolution prior to transmission over network 130. In another embodiment, frames may be dropped prior to transmission. For example, a file encoded at 24 frames per second may be reduced to 12 frames per second by dropping ever other frame prior to transmission. If a low bandwidth communication link exists between playback engine 150 and decoder 140, decoder 140 may be configured to transmit a fraction of the lines per frame, according to one embodiment. These embodiments may be particularly useful when the playback engine 150 is a cellular telephone or other wireless device, requiring high quality video over low bandwidth networks, such as GSM, CDMA, and TDMA. In alternate embodiments, when encoder 120 encodes a fraction of the lines per frame, it results in a smaller compressed file 121 transmitted over network 130, and less data decoded by decoder 140 for faster performance. Having discussed numerous illustrations of encoding and decoding functions according to the present method and system, a brief description of the communication network encompassing the present system is provided.

An Exemplary Network Architecture

Figure 5:
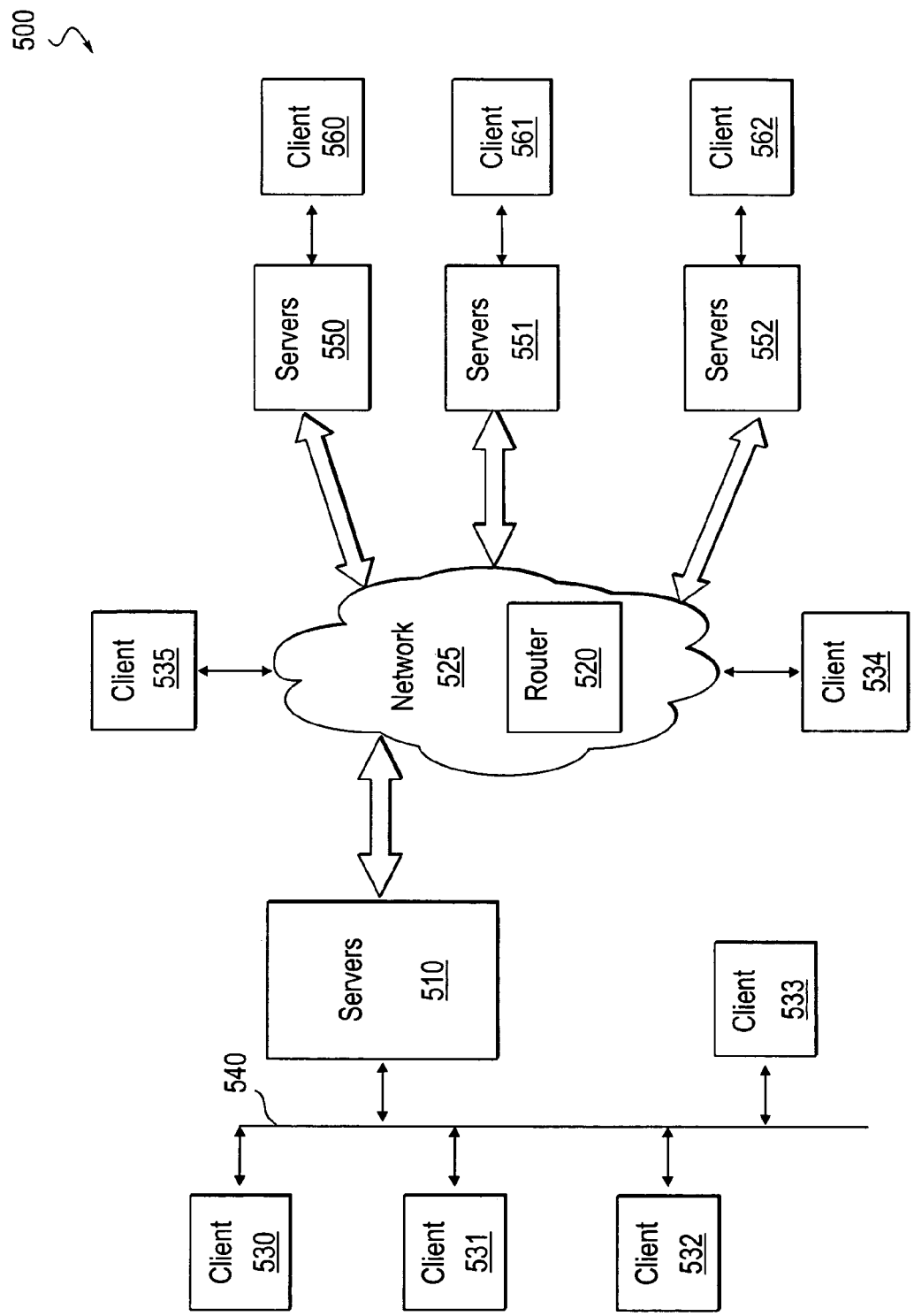
FIG. 5 illustrates an exemplary network architecture, according to one embodiment of the present invention.

Elements of the present invention may be included within a client-server based system 500 such as that illustrated in FIG. 5. According to the embodiment depicted in FIG. 5, one or more servers 510 communicate with a plurality of clients 530–535. The clients 530–535 may transmit and receive data from servers 510 over a variety of communication media including (but not limited to) a local area network ("LAN") 540 and/or a wide area network ("WAN") 525 (e.g., the Internet). Alternative communication channels such as wireless communication via GSM, TDMA, CDMA or satellite broadcast (not shown) are also contemplated within the scope of the present invention. Network 130 illustrated in FIG. 1, may be a local area network, such as LAN 540 or a wide are network, such as WAN 525.

Servers 510 may include a database for storing various types of data. This may include, for example, specific client data (e.g., user account information and user preferences) and/or more general data. The database on servers 510 in one embodiment runs an instance of a Relational Database Management System (RDBMS), such as Microsoft™ SQL-Server, Oracle™ or the like. A user/client may interact with and receive feedback from servers 510 using various different communication devices and/or protocols. According to one embodiment, a user connects to servers 510 via client software. The client software may include a browser application such as Netscape Navigator™ or Microsoft Internet Explorer™ on the user's personal computer, which communicates to servers 510 via the Hypertext Transfer Protocol (hereinafter "HTTP"). Among other embodiments, software such as Microsoft's Word, Power Point, or other applications for composing and presentations may be configured as client decoder/player. In other embodiments included within the scope of the invention, clients may communicate with servers 510 via cellular phones and pagers (e.g., in which the necessary transaction software is electronic in a microchip), handheld computing devices, and/or touch-tone telephones (or video phones).

Servers 510 may also communicate over a larger network (e.g., network 525) with other servers 550–552. This may include, for example, servers maintained by businesses to host their Web sites—e.g., content servers such as "yahoo.com." Network 525 may include router 520. Router 520 forwards data packets from one local area network (LAN) or wide area network (WAN) to another. Based on routing tables and routing protocols, router 520 reads the network address in each IP packet and makes a decision on how to send if based on the most expedient route. Router 520 works at layer 3 in the protocol stack. According to one embodiment, compressed video file 121 is transmitted over network 130 as a series of IP packets.

According to one embodiment of the present method and system, components illustrated in FIG. 1 may be distributed throughout network 500. For example, video sources 101–106 may be connected to any client 530–535 or 560–562, or severs 510, 550–552. Digital video capture device 110 encoder 120, decoder 140 and playback engine 150, may reside in any client or server, as well. Similarly, all or some of the components of FIG. 1, may be fully contained within a signal server, or client.

In one embodiment, servers 550–552 host video capture device 110 and encoder 120. Video sources connected to clients 560–562 provide source video to servers 550–552. Servers 550–552 encode and compress the source video and store the compressed video file 121 in databases, as described above. A client 530–532, may request the compressed video file 121. Servers 550–552 transmit the compressed video file 121 over network 125 to the client 530–533 via server 510. Server 510 may send compressed video file 121 in blocks of frames, for example 100 frames per packet. In addition, server 510 and the client 530–533 may be connected via a dial-up connection having bandwidths between 14.4 kbps and 56 kBps. Clients 530–533 include decoder 140, and upon receiving the compressed video file 121, decode the file 121 and provide the decoded video file 141 to an attached playback engine. One of ordinary skill would realize that numerous combinations may exist for placement of encoder 120, decoder 140 and video capture device 110. Similarly, encoder 120, decoder 140 and capture device 110 may exist in the form of software executed by a general processor, or as a dedicated video processor included on an add-on card to a personal computer, a PCMCIA card, or similar device. Additionally, decoder 140 may reside as a software program running independently, or decoder 140 may exist as a plug-in to a web browser. Decoder 140 may be configured to format its video output to have compatibility with existing video devices that support motion JPEG, MPEG, MPEG-2, MPEG-4 and/or JVT standards.

An Exemplary Computer Architecture

Figure 6:
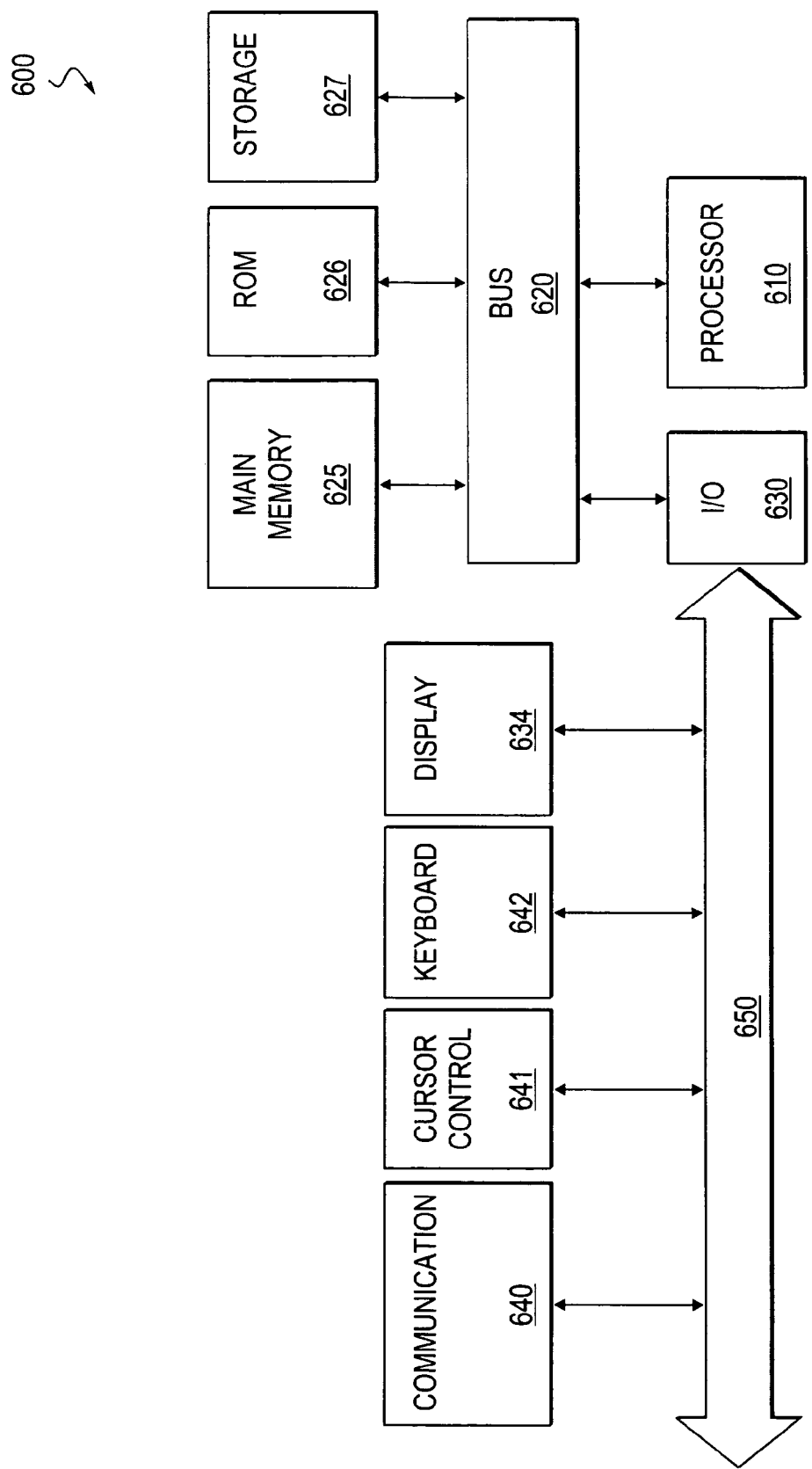
FIG. 6 illustrates an exemplary computer architecture, according to one embodiment of the present invention.

Having briefly described an exemplary network architecture which employs various elements of the present invention, a computer system 600 representing exemplary clients 530–535 and/or servers (e.g., servers 510), in which elements of the present invention may be implemented will now be described with reference to FIG. 6.

One embodiment of computer system 600 comprises a system bus 620 for communicating information, and a processor 610 coupled to bus 620 for processing information. Computer system 600 further comprises a random access memory (RAM) or other dynamic storage device 625 (referred to herein as main memory), coupled to bus 620 for storing information and instructions to be executed by processor 610. Main memory 625 also may be used for storing temporary variables or other intermediate information during execution of instructions by processor 610. Computer system 600 also may include a read only memory (ROM) and/or other static storage device 626 coupled to bus 620 for storing static information and instructions used by processor 610.

A data storage device 627 such as a magnetic disk or optical disc and its corresponding drive may also be coupled to computer system 600 for storing information and instructions. Computer system 600 can also be coupled to a second I/O bus 650 via an I/O interface 630. Multiple I/O devices may be coupled to I/O bus 650, including a display device 643, an input device (e.g., an alphanumeric input device 642 and/or a cursor control device 641). For example, video news clips and related information may be presented to the user on the display device 643.

The communication device 640 is for accessing other computers (servers or clients) via a network 525, 540. The communication device 640 may comprise a modem, a network interface card, or other well-known interface device, such as those used for coupling to Ethernet, token ring, or other types of networks.

An Exemplary Encoding Process

Figure 7:
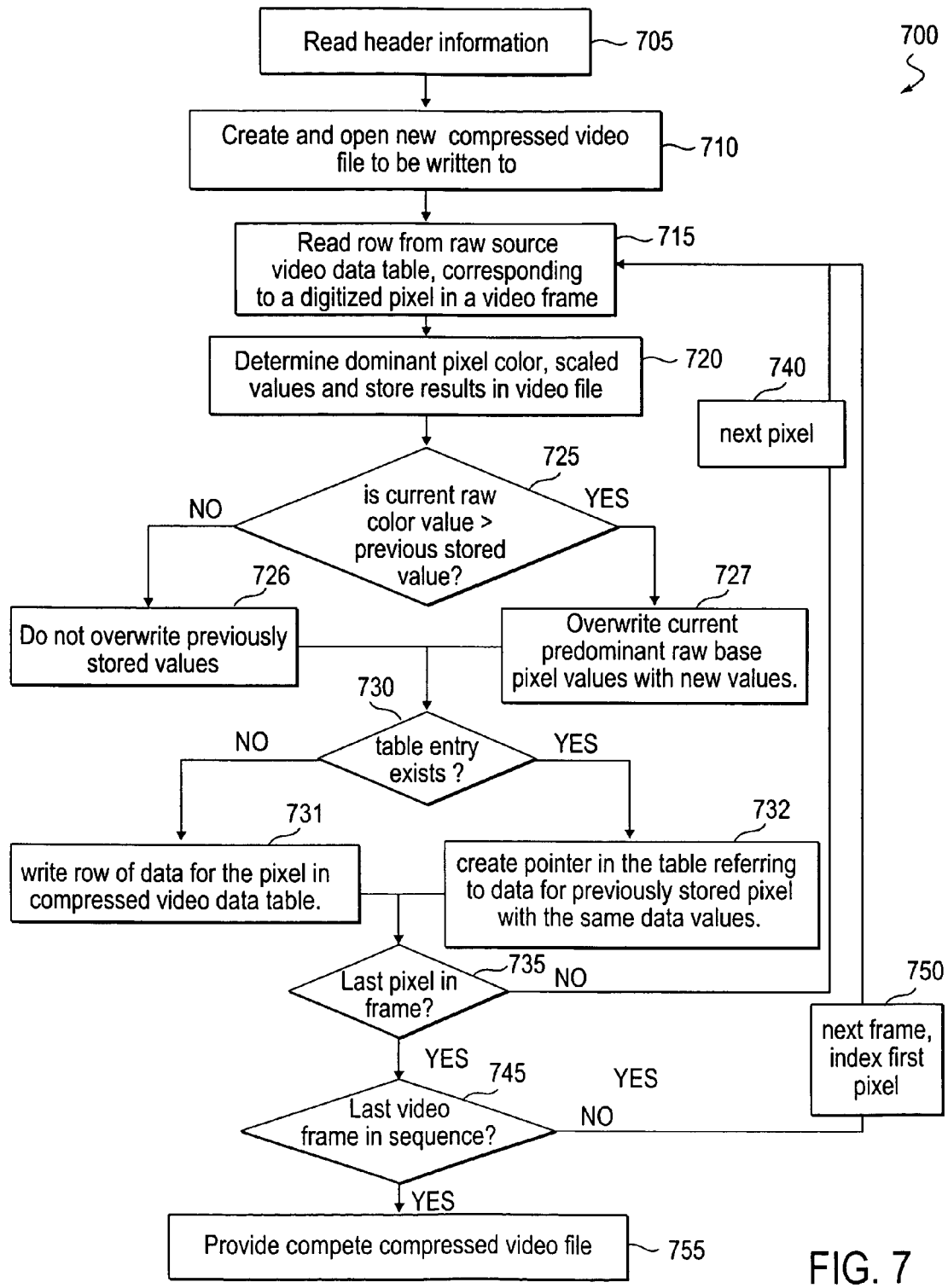
FIG. 7 illustrates a flow diagram of an exemplary encoding process, according to one embodiment of the present invention.

FIG. 7 illustrates a flow diagram of an exemplary encoding process 700, according to one embodiment of the present invention. As discussed above, encoder 120 receives raw video data 111, compresses and encodes it, and then provides a compressed video file 121, including pixel references values $350_i$, compressed video tables $320_i$, and any additional parameters and optional information desired. Encoding process 700 generates a compressed video file 121 as follows:

Encoder 120 reads raw header information provided by header file generator 190 (block 705). From the raw header information, encoder 120 can determine the resolution of each frame, and can locate the center of the frame, including its mid-line and center pixel coordinates. The compressed video file 121 is opened (block 710) so that compressed video data table $320_i$, pixel reference values $350_i$, file header data, center pixel data, and audio data may be stored throughout the present process. An iterative process for populating the compressed video data tables $320_i$ begins by reading a row $221_i$ of raw source video data table $220_i$ corresponding to a digitized pixel within video frame 210, (block 715).

Red pixel value $223_i$, green pixel value $224_i$, and blue pixel value $225_i$ are analyzed to determine the dominant color of the pixel—whether red, green, blue or black (block 720). The black reference pixel is the pixel in the frame having the highest intensity R, G, and B values. For example, a raw source data table row $221_i$ having R, G, and B values of "999", "999", and "999" (where R, G, and B are each represented on a scale of 0–1000) is likely to be a black reference pixel value $350_i$. In one embodiment, to be a black pixel, the R, G, and B values must be over a threshold value, such as eighty percent of their respective maximum values. For example, if the maximum value is 1000, then all three values must be at or over 800 to be a black pixel. Otherwise, the dominant color is the color represented by the higher of the two remaining color values. Although numerous methods exist for determining the dominant color of the pixel, according to one embodiment, raw data values are compared. For example, raw data table row $221(1)_1$ shows pixel 1 having a red pixel value $223_1$, of 625, green pixel value $224_1$, of 350, and blue pixel value $225_1$, of 205, as the red value is the most significant value, then red is determined to be the dominant color of the pixel. Thus, an indicator of "red" is stored in row $321(1)_1$, of color column $323_1$, within compressed video table $320_i$.

Additionally, the dominant color value $323_i$ includes a scaled color value. For example, if the color pixel values range between 0 and 1,000, a scaled color value, may be between 0 and 10. Thus, for row $221(1)_1$, since red is the dominant color of the pixel, the red pixel value 2231, of 625 is mapped to a scaled color value of 6 within dominant color value $323_1$. In another embodiment, scaled color values are also computed for green pixel value $224_1$ and blue pixel value $225_1$, even though they are not dominant colors of pixel 1. In yet another embodiment, no scaled color values are computed at all, but only the dominant color of the pixel is determined. In another embodiment, no dominant color values are provided, but only one or more scaled color values. In yet another embodiment, more than one dominant color value is determined.

A luminance value $226_i$ is converted to a scaled luminance value $326_i$. For example, if raw luminance value $226_i$ lies between 0 and 1,000, a scaled luminance value 326 could be between 0 and 10. Thus, for row $221(1)_1$, pixel 1's luminance value 226, of 620 is mapped to a scaled luminance value of 6. In alternate embodiments, additional scaling factors and scaling ranges may be used, such as 0–20, 0–50, etc. Likewise, a scaled chrominance value 327, is determined and stored in compressed video data table $220_i$. As discussed above, a color depth value $328_i$ may be stored in table $220_i$ for each pixel, where the color depth value $328_i$ is the average value of the scaled chrominance value $327_i$ and scaled luminance value $326_i$ rounded up to the nearest integer. In an alternate embodiment, a color depth value $328_i$ is substituted for luminance value $326_i$ and chrominance value $327_i$.

The raw RGB values $223_i$–$225_i$ of raw data table row $220_i$ are compared against previous RGB values, to determine the highest intensity values of red, green, blue and black pixels within frame $210_n$ (decision block 725). The highest intensity pixels are stored as reference pixel values $350_i$. It is notable that the entire RGB triplet value is stored for each reference pixel value $350_i$ as well as the corresponding luminance value $226_i$ and chrominance value $227_i$. For example, if pixel 1 of row 221 is determined to be the highest intensity value for red in frame $210_n$ then reference pixel value $350_i$ will contain a red value of 625, a green value of 350, a blue value of 205, a luminance value of 620 and a chrominance value of 725.

If a newly examined pixel's RGB values are more intense than the value stored in pixel reference values $350_i$, then the new pixel's RGB value is used (block 727), otherwise the pixel reference values $350_i$ remain unchanged (block 726). In one embodiment, the reference pixel values $350_i$ are stored in the center of each compressed frame of video. In alternate embodiments, the reference pixel values $350_i$ are stored at the beginning of each compressed frame, or at the end of each frame. In alternate embodiments, a first set of reference pixel values $350_i$ are provided for the top half of the frame, and a second set of reference pixel values are calculated and stored for the bottom half of the frame. In such a case, the top half of the frame is processed separately from the bottom half of the frame, with two reference pixel values being computed for each half. In the top half of the frame the reference pixels for the most prevalent color and the second most prevalent color (as determined by the dominant color mappings) are determined. In the bottom half of the frame, the remaining two reference pixels are determined. In yet another embodiment, a single reference pixel value set $350_i$ is used for a block of frames.

Once the dominant color, and scaled luminance and chrominance values are determined for a particular pixel, previous compressed pixel entries within compressed video data table $320_i$ are examined to identify redundancies (decision block 730). If an existing row has the same (or similar, within a tolerance threshold) values as the present row, then the table entry for the present row is entered as a pointer, referring to values for the existing row (block 730). If no existing row has the same (or sufficiently similar) values as the present row, then the table is updated with the present values (block 731).

Encoder 120 determines if the last pixel of the video frame has been mapped. (decision block 735). If the last pixel has not been mapped, then the encoder 120 processes the next pixel (block 740) and the next iteration begins (block 715). If the last pixel of the frame is mapped, then encoder 120 determines if the last frame $210_n$ has been mapped completely (decision block 745). When the last pixel of the last frame $210_n$ has been encoded, the compressed video file 121 is closed (block 755). If additional frames $210_n$ still need processing, encoder 120 begins encoding the next frame (block 750). The next frame processing iteration commences again (block 715). Once each pixel of each frame of the video sequence is encoded, and reference pixel values $350_i$ for each frame are calculated, the compressed video file 121 is complete.

In one embodiment, redundancies are found between frames, including redundant pixel reference values $350_i$ and redundant pixel values. By replacing the redundant entries with inter-frame pointers, additional compression may be recognized. In alternate embodiment, individual encoded frames may be provided by encoder 120, as they are completed. Blocks of frames may be provided as encoding is completed, as well.

As discussed briefly above, in some embodiments each frame $210_i$ is divided in half. Two (2) of the four (4) pixel reference values $350_i$ are derived from the top half of frame $210_n$, and the remaining values are derived from the lower half of the frame $210_n$. In alternate embodiments, frames may be divided into other fractional amounts for determining reference pixel values $350_i$. Audio data accompanies the compressed video data with or without compression. Additional embodiments allow for encoding of pixels from top left to bottom right, as well as other encoding sequences.

In additional embodiments, encoder 120 only encodes odd or even rows of pixels, or every other pixel of a frame in order to save bandwidth. Additionally, encoder 120 may encode video originally provided for one protocol and translate it to another protocol. For example, a source video captured from an NTSC source can be encoded and formatted for transmission on a PAL display system by using appropriate pixel interpolation or reduction.

An Exemplary Decoding Process

Figure 8:
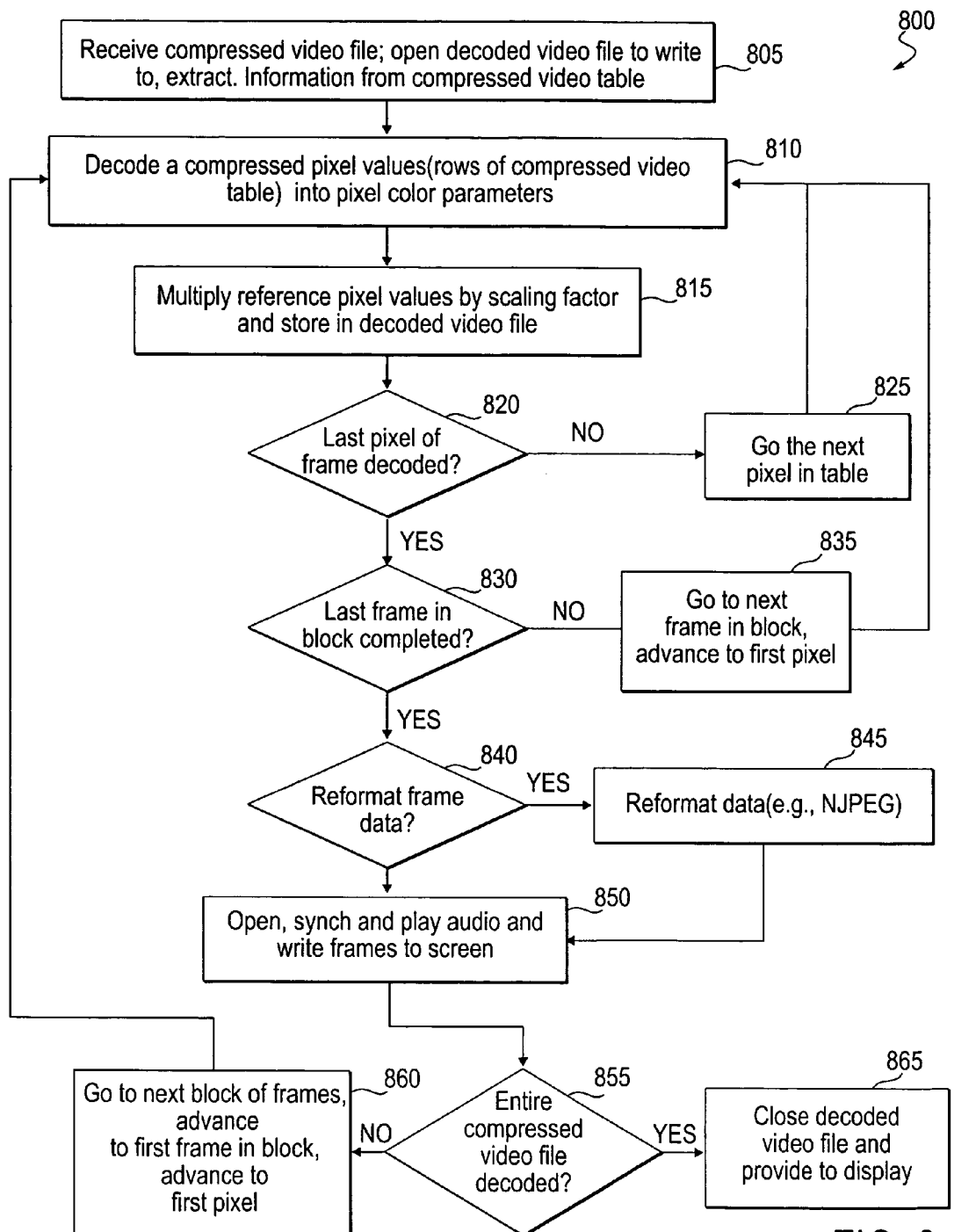
FIG. 8 illustrates a flow diagram of an exemplary decoding process, according to one embodiment of the present invention.

FIG. 8 illustrates a flow diagram of an exemplary decoding process, according to one embodiment of the present invention. As discussed above, decoder 140 receives the compressed video file 121, decodes and decompresses it, and provides the decoded video file 141 to a playback engine 150. Decoding process 800 generates decoded video 141 as follows:

Decoder 140 receives compressed video file 121 and extracts header data, reference pixel value $350_i$ audio data and compressed video data table $320_i$ rows $321(1)_i$ for a number of frames $210_n$ (block 805). In one embodiment, blocks of ten (10) frames are decoded and the results passed to playback engine 150. In alternate embodiments other variable block sizes of frame lengths may be used, according to the specific application. Additionally, header data may only be transmitted with the first block of frames or even just the first frame. The header data may include the overall file size, audio information, video format, file system O/S, frame rate, video format ratio, number of frames and video length.

Decoder 140 maps each dominant color value (R, G, B, or Black) to a corresponding reference pixel value $350_i$. The reference pixel value $350_i$ is then scaled by the scaled color value. In one embodiment, not only are the dominant color component rescaled, but even the non-dominant color components are mapped from reference pixel value $350_i$ with rescaling. The resulting rescaled pixel color parameters are stored in decoded video table $420_i$ (block 810). Thus, as an example for pixel number 1 of table $320_i$ having a color code of "Red", and scaled color value of 6, if the reference pixel value $350_n$ for the "red" pixel is 625, 350, 205 for its respective RGB values, then pixel number 1's pixel color parameters (RGB values $423_1$–$425_1$) will be 375, 225, and 123, respectively (with red value=0.6×625=375; green value=0.6×350=225; blue value=0.6×205=123). In another embodiment, only the dominant color is scaled, therefore, the red pixel described above would have and R, G, and B value of 375, 350 and 205, respectively. Additionally, the luminance and chrominance parameters of the reference pixel are multiplied by their respective scaling factors (from table 320 for the pixel under consideration) and stored in decoded video data table 420 (block 815). In the example of FIG. 4, a scaled value $326_1$, of 6, for pixel 1, is referenced to red reference pixel value $350(a)_1$ having a luminance value of 620. Thus rescaled luminance value $426_1$ is 372 (Rescaled luminance value=0.6×620=372). Likewise rescaled chrominance value $427_1$ is 508.

In alternate embodiments, scaled values, such as scaled color value, scaled luminance $326i$, and scaled chrominance $327_i$ are rescaled relative to a maximum possible value, rather than to a reference pixel value $350_i$. In such cases, it may not be necessary to compute and transmit the reference pixels. Additional embodiments allow some scaled values to be rescaled relative to reference values and other scaled values are rescaled relative to maximum possible values.

Decoder 140 determines if the last pixel of the frame is decoded (decision block 820). If not, the next pixel in the frame is indexed (block 825) and decoded (blocks 810 and 815). If the end of a frame is reached, decoder 140 determines if it has completed decoding the entire block of frames (decision block 830). If the last frame in the block has not been decoded, the next frame in the block is indexed (block 835) and the frame's pixels are decoded according to blocks 810–825 with its respective reference pixel value $250_i$. If the last frame in the block has been decoded, decoder 140 determines if table 420 should be reformatted according to a particular playback protocol, such as motion JPEG (decision block 840). If necessary, reformatting is performed (block 845). Note, the reformatting may be performed by the playback engine rather than the decoder. If no reformatting is necessary or if reformatting is complete, audio data is synchronized with the decoded video (block 850). As discussed above, audio data may be MP3, .wav, or similarly compressed audio data.

Decoder 140 determines if the last frame of the last block of frames has been decoded (decision block 855). If decoding is complete, a decoded video file 141 is closed and provided to playback engine 150 (block 865). If decoding is not complete, the next block of video frames are indexed and decoded according to blocks 810–865.

In alternate embodiments, frames are decoded successively, without the use of blocks. The decoded video file 141 may be streamed to playback engine 150 while decoder 140 is still decoding compressed file 121. Yet in another embodiment decoder 141 takes the form of a look-up table having every possible combination of color code, luminance, and chrominance values listed for immediate mapping. In additional embodiments, decoder 140 only decodes odd or even rows of pixels, or every other pixel in order to save bandwidth. Additionally, decoder 140 may decode video originally provided for one protocol and translate it to another protocol. For example, a source video captured from an NTSC source can be decoded and formatted for transmission on a PAL display system. Additional embodiments allow for decoding of pixels from bottom right to top left, as well as other decoding sequences. In one embodiment, the decoder may read a trailer appended to the communicated file. The trailer may provide the decoder with audio/visual information, such as the number of frames and or files remaining in the encoded video, index information to the next file, or other audio/video information related to playback.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

A system and method for compressing video have been described. It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method, comprising:
  receiving video information as a plurality of pixel value sets grouped into a plurality of digitized video frames, each pixel value set of the plurality of pixel value sets representing a digitized pixel of the video information and including a first portion defining a multi-dimensional color space for the video information and a second portion; and
  encoding, on a pixel-by-pixel basis, the first portion of each pixel value set so as to define each digitized pixel in terms of only one of a plurality of dominant color values, each dominant color value corresponding to one dimension of the multi-dimensional color space.

2. The method of claim 1, wherein each dominant color value of the plurality of dominant color values comprises one of a red value, a blue value, or a green value.

3. The method of claim 1, wherein the second portion of each pixel value set includes a chrominance value and luminance value.

4. The method of claim 1, wherein the first portion of each pixel value set includes one or more of: RGB values, CMYK values, component video values, and composite video values.

5. The method of claim 1, wherein the video information is received from a video acquisition device.

6. The method of claim 5, wherein the video acquisition device receives broadcasts formatted as one or more broadcast protocols and provides the video information, wherein the broadcast protocols include NTSC, PAL, SECAM, RGB, CMYK, and HDTV.

7. The method of claim 1, further comprising creating a header file including parameters describing the video information.

8. The method of claim 1, further comprising:
  scaling the first portion of each pixel value set to provide a plurality of scaled color values.

9. The method of claim 8, further comprising scaling the second portion of each pixel value set to provide a plurality of scaled value sets.

10. The method of claim 9, further comprising:
  storing each scaled value set of the plurality of scaled value sets, each scaled color value of the plurality of scaled color values and each dominant color value in an encoded video table having a plurality of rows, wherein each row of the plurality of rows represents an encoded pixel of the video information.

11. The method of claim 10, wherein the plurality of rows are divided into a plurality of encoded video tables, wherein each encoded video table of the plurality of encoded video tables corresponds to an encoded frame of the video information representing a digitized video frame of the plurality of digitized video frames.

12. The method of claim 10, wherein the plurality of rows includes previous rows and subsequent rows, and wherein subsequent rows that are identical to previous rows are replaced with pointers to the previous rows.

13. The method of claim 11, further comprising:
  determining a reference pixel value set for each encoded video table to provide a plurality of reference pixel value sets, and
  storing the reference pixel value set with its associated encoded video table.

14. The method of claim 13, further comprising storing the plurality of encoded video tables and the plurality of reference pixel values sets in an encoded video file.

15. The method of claim 13, wherein determining the reference pixel value set comprises, for each digitized video frame, analyzing the first portion of each pixel value set to identify one or more highest color intensity pixel value sets, and wherein the reference pixel value set includes the one or more highest color intensity pixel value sets.

16. The method of claim 13, wherein the reference pixel value set includes at least one red reference pixel value, one green reference pixel value, and one blue reference pixel value.

17. The method of claim 15, wherein the reference pixel value set include a red reference pixel value set, a blue reference pixel value set, a green reference pixel value set, and a black reference pixel value set.

18. The method of claim 15, wherein the digitized video frame has an upper half and a lower half, and wherein one or more of the reference pixel values are derived from the upper half of the digitized video frame, and one or more of the reference pixel values are derived from the lower half of the digitized video frame.

19. A method, comprising:
  receiving a pixel as a pixel value set representing a digitized pixel defined by parameters of a multi-dimensional color space, the pixel value set including a first portion and a second portion; and
  encoding the first portion of the pixel value set so as to define the digitized pixel in terms of only one of a plurality of dominant color values, each dominant color value corresponding to one dimension of the multi-dimensional color space.

20. The method of claim 19, wherein each dominant color value comprises one of a red value, a blue value, or a green value.

21. The method of claim 19, wherein the second portion of the pixel value set includes a chrominance value and luminance value.

22. The method of claim 19, wherein the first portion of the pixel value set includes one or more of: RGB values, CMYK values, component video values, and composite video values.

23. The method of claim 19, further comprising:
scaling the first portion of the pixel value set to provide a scaled color value.

24. The method of claim 23, further comprising scaling the second portion of the pixel value set to provide a scaled value set.

25. The method of claim 24, further comprising:
storing the scaled value set, the scaled color value and the dominant color value in a data file.

26. The method of claim 25, further comprising:
determining a reference pixel value set for the pixel, and
storing the reference pixel value set in the data file.

27. The method of claim 26, wherein the reference pixel value set includes at least one red reference pixel value, one green reference pixel value, and one blue reference pixel value.

* * * * *